Nov. 16, 1943.          F. L. DARLING                2,334,611
                DELAYED ACTION BRAKE HOLDING MECHANISM
                Filed March 18, 1940          2 Sheets-Sheet 1

Inventor
Frank L. Darling
By Dieterich & Rutley
             Attorneys

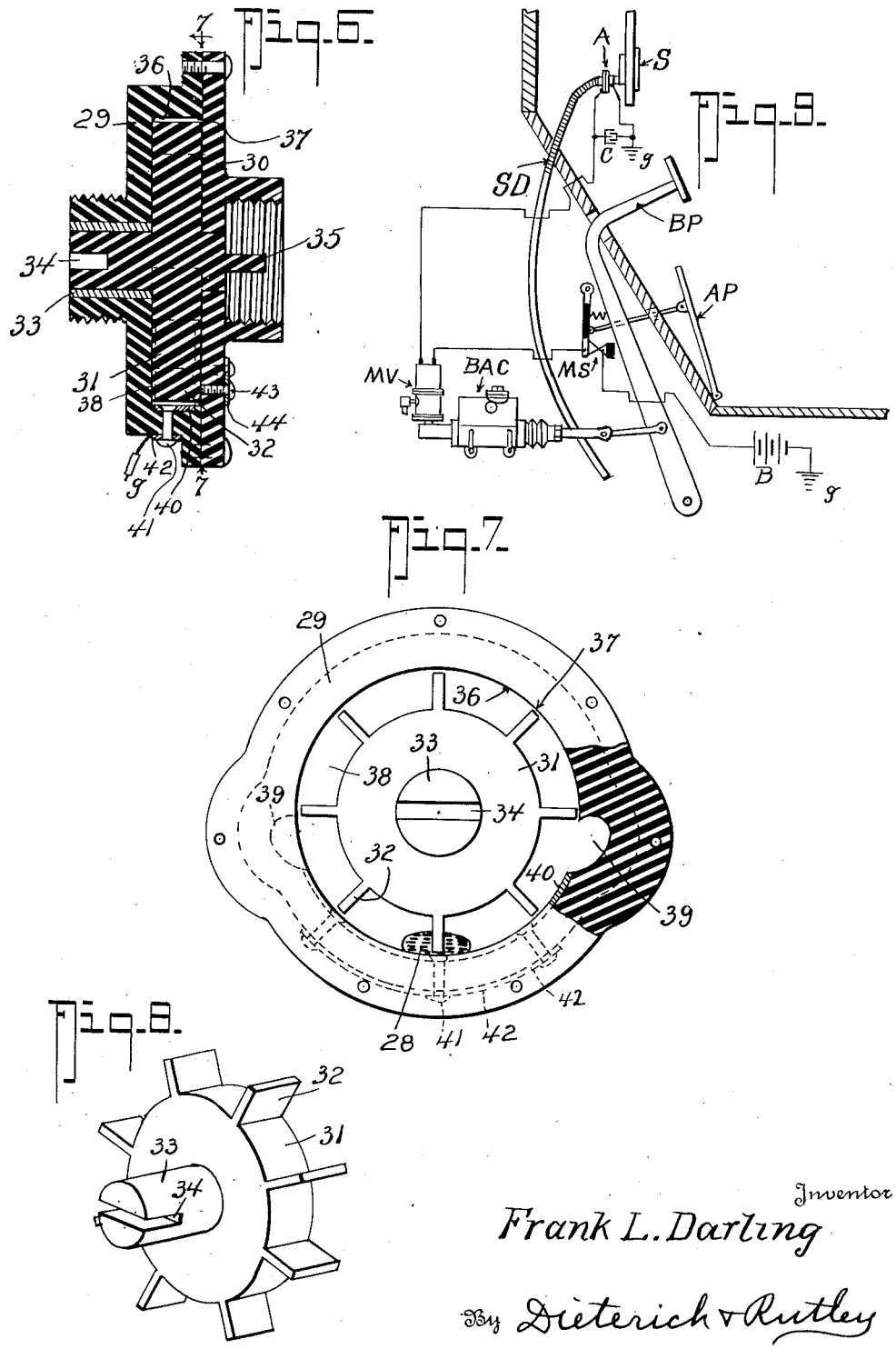

Patented Nov. 16, 1943

2,334,611

UNITED STATES PATENT OFFICE 2,334,611

DELAYED ACTION BRAKE HOLDING MECHANISM

Frank L. Darling, Hollywood, Calif., assignor to Wagner Electric Corporation, St. Louis, Mo., a corporation of Delaware Application March 18, 1940, Serial No. 324,717

14 Claims. (Cl. 192—3)

This invention relates to the art of vehicle braking, and especially to the brake systems used in motor vehicles.

The invention has for an object the provision of means which will operate after the propelling shaft or the driving wheels of the vehicle come to rest and after the lapse of a predetermined period of time to lock or hold the brakes in the applied position, thus making it possible for the operator to release the brakes in the usual way provided he acts within that predetermined period of time; if he does not so act, the device will lock the brakes and make it unnecessary for him to hold the brake pedal or brake-operated instrumentality in the brake applying position for holding the vehicle from moving.

Another object is to provide a brake locking device by the use of which, should a sudden application of the brakes be made which would lock the driving wheels and cause a skid or slip of the vehicle, the device will delay its operation for a sufficient time so as to permit the operator to relieve the brake pressure and allow the wheels to turn again while the momentum of the vehicle carries the machine along during the skid.

Further, it is an object to provide means which are not dependent upon inertia for their operation, but depend only on the rotation or non-rotation of the propeller shaft from which the driving wheels derive their power.

A further object is to provide a device which is particularly adapted for cooperation, in combination, with the brake-holding apparatus of my Patents No. 2,133,538, issued October 18, 1938; No. 2,133,891, issued October 18, 1938; and No. 2,149,190, issued February 21, 1939, although its use is not necessarily limited thereto.

Other objects will in part be obvious and in part be pointed out hereinafter.

To the attainment of the aforesaid objects and ends the invention still further resides in the novel details of construction, combination and arrangement of parts, all of which will be first fully described in the following detailed description, and then be particularly pointed out in the appended claims, reference being had to the accompanying drawings, in which—

Fig. 6 is a central longitudinal section of another embodiment of the automatic delayed action circuit closer.

Fig. 7 is a section on the line 7—7 of Fig. 6.

Fig. 8 is a perspective view of the rotor shown in Figs. 6 and 7.

Fig. 9 is a diagrammatic view of my invention complete.

Figure 1:
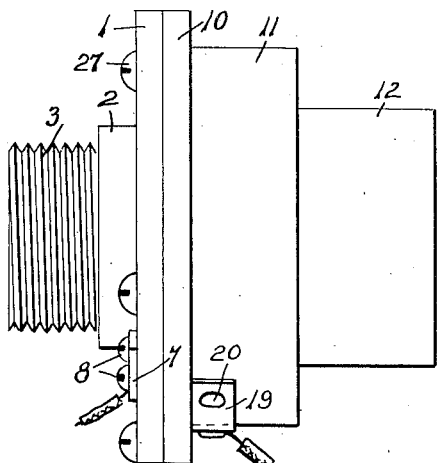
Fig. 1 is a side elevation of one embodiment of an automatic delayed action circuit closer which comprises an essential part of my invention.

In the drawings, in which like letters and numerals of reference represent like parts in all the figures, I designates the male section of the automatic delayed action circuit closer and 11 the female section thereof, these being secured together by screws 21, or other suitable means, passing through the flange 10.

The male section of the case includes a boss 2 having the male thread 3 for attachment to a speedometer drive shaft tube. It is also provided with a central metallic bushing 4 for the coupling end of a flexible speedometer drive shaft (not shown) which fits into the bore 9 of the bushing. The bushing is formed with an annular disc-like enlargement 5 having a groove 6 over its upper 190° (more or less).

8 represents several (three being shown in the drawing) contact screws which constitute contact points. The screws are spaced one at the bottom of the device and one at each side thereof approximately 15° (more or less) from the bottom to allow for operation when the vehicle is on an incline. The screws 8 pass through a conductor plate 7 which electrically connects them together as one.

The female section of the case has an internally threaded hub 12 to receive the male end (not shown) of a speedometer S (Fig. 8). It also has an internal abutment web 13 and, in a recess 15, it carries a ball bearing 16 for the hub 24 of the rotor. The case part 11 also has a chamber 14 in which the rotor operates and into which the enlargement 5 projects. The member 11 has an internal annular groove 17, the lower 180° (more or less) of which is occupied by a fixed contact strip 18, preferably of copper, for reasons later explained. The strip 18 is held in place and is electrically connected to an outside contact plate 19 by rivets 20, or other suitable means.

The case parts 1 and 11 are shown as made of suitable insulating material such as Bakelite hard rubber or other similar electrically nonconductive strong material.

Figure 2:
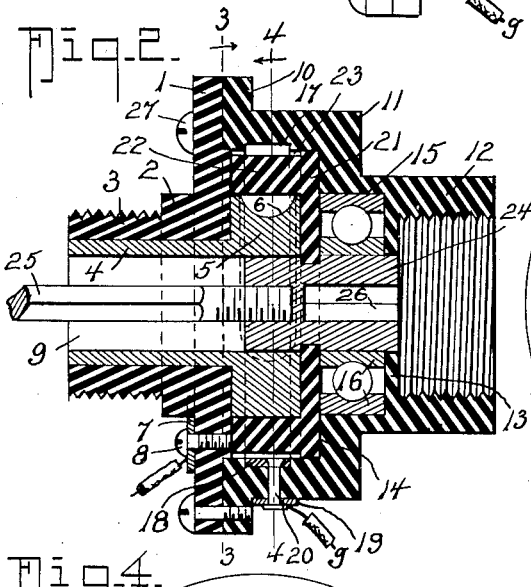
Fig. 2 is a central vertical longitudinal section of the same.
Figure 3:
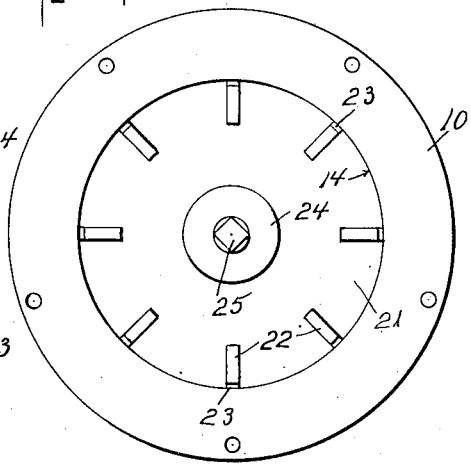
Fig. 3 is an elevation of one of the case parts and the rotor, looking in the direction of the arrow on the line 3—3 of Fig. 2, the other case part and the member carried thereby being omitted.
Figure 4:
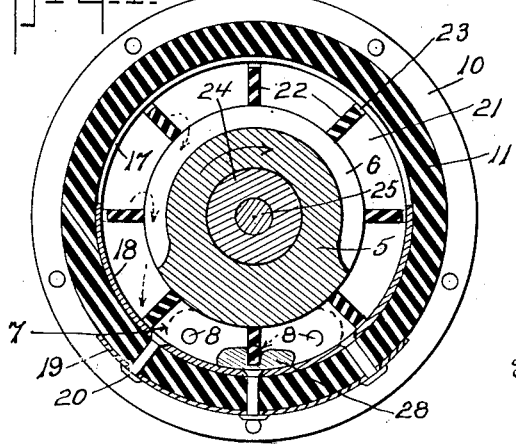
Fig. 4 is a cross section on the line 4—4 of Fig. 2, looking in the direction of the arrow.
Figure 5:
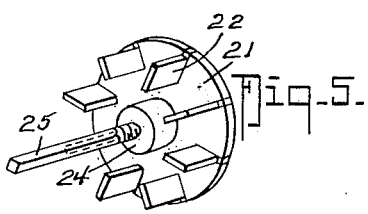
Fig. 5 is a detailed perspective view of the rotor.

The rotor consists of a disc 21 and blades 22 of insulation. The disc 21 has rigidly secured to it a hub 24 (of metal in the embodiment of Figs. 1-5), which hub has a squared socket 26 in one end and has a squared stub shaft 25 in the other end for coupling to a flexible speedometer drive shaft end and to the speedometer so that while the speedometer drive shaft is rotating the rotor will always be rotated in chamber 14.

It will be observed that the inner edges of the blades 22 lie close to the periphery of the annular enlargement 5, while the outer edges of the blades are spaced from the annular wall of the chamber 14 as at 23. The amount of this spacing in part determines the time the action of the mercury 28 for closing is delayed after the rotor stops turning.

In Figs. 6 and 7 is shown another embodiment of the circuit closer. In this form the case parts 29 and 30 are composed wholly of insulation, as is also the rotor. The rotor comprises a hub 31 having radial blades 32 and a shaft 33 having female, 34, and male, 35, ends for coupling in a speedometer drive. In this form, as in the preceding one, the outer ends of the blades 32 are spaced from the peripheral wall 36 of the chamber 38, as at 37.

The case part 29 in this form of the device has no annular groove in its upper half, but is provided with two oppositely disposed pockets 39, each sufficiently large to contain a globule of mercury 28 when the same is swept into a pocket by the blades of the rotor accordingly as the rotor is turning in one direction or the other. A copper strip 40 extends along the lower periphery of chamber 38 flush with its peripheral wall 36 and is secured by rivets 41 to the case and electrically connected to a conductor strip 42, as in the preceding form.

A plurality of contact points 43, electrically connected by a plate 44, are mounted in the casing part 30, as shown in Fig. 6.

Fig. 9 illustrates diagrammatically the application of my device to a hydraulic brake applying and holding system which embodies also the hydraulic brake holder of two of my patents aforesaid. The application of my device to the mechanical brake system of my other patent is substantially the same.

In Fig. 9, A represents the delayed action circuit closer hereinbefore described (either form); S is the usual speedometer; SD, the usual speedometer drive, now generally run off the final drive shaft of the transmission or off the propeller shaft; BP is the brake pedal; AP is the accelerator pedal; BAC is the brake applying cylinder; MV is the magnet valve; MS is the manual switch; B is the usual battery; and C is the condenser.

*Operation*

Assume that the first form of the circuit closer is being used. The case is so mounted and held that the middle contact pin 8 (Figs. 1, 2 and 4) will be at the lowest point. Assume the vehicle to be at rest. Now as soon as the vehicle is started, the rotor begins to turn one way or the other, accordingly as the vehicle is running forwardly or being backed, and the blades sweep the mercury globule 28 upwardly clear of the strip 18. As soon as the blade or blades which are carrying the mercury pass the end of the strip 18 the mercury flows into the groove 6 to return toward the bottom. However, so long as the rotor is turning, the mercury will not reach the bottom of the chamber but on leaving one blade to pass along groove 6 it will be intercepted by the next blade and raised again, and so on. Upon stoppage of the rotation of the rotor—say, by the stopping of the vehicle—the mercury ahead of the blade which was then sweeping it upwardly will be teased through the space between the edge of that blade by the copper strip and gravitate down to the lowest level, passing any other blade that it may encounter in the meantime in the same way.

The time required for the mercury to be teased through the space 23 depends upon several factors, namely: the cross sectional area of that space, the presence and width of the copper strip, and the number of blades on the rotor past which the mercury must be teased before it will form a pool at the bottom of sufficient depth to bridge the gap between the copper strip and a contact point 8.

As soon as a blade which carries the mercury upwardly passes the end of the strip 18, the mercury will not pass down along the groove 17 between it and the end of the blade but will flow to groove 6. The mercury gravitates immediately into the groove 6 and is prevented from being carried over the top of the rotor. Even when the case is made of iron, for example, the mercury will not pass the ends of the blades when they reach the groove 17, but only when the blade is opposite the copper strip, unless of course the groove 17 is made of considerable depth so that the surface tension will have little or no effect. In that event the blades would not sweep the mercury up.

Of course the device will operate without the presence of groove 17, but when groove 17 is used and the rotor is being driven at an excessive speed which would cause centrifugal force to overcome the action of gravity on the mercury, the mercury will be spread into the groove 17 and not enough of it will be carried over and down on the opposite side by the sweeping of the blades to cause the gap between strip 18 and points 8 to be closed thereby.

During rotation of the rotor any mercury which teases past the end of a blade on the upgoing side will be caught by the next blade and be swept up again so that even though the rotor is turning very slowly, sufficient mercury cannot reach the lowest level to close the circuit. Only after the rotor has been stopped for a predetermined length of time will the mercury reach the lowest level to a depth sufficient to engage a contact point 8 and close the circuit.

Closing the circuit causes magnet MV to be energized to effect a hydraulic lock in the brake line after the brake pedal has been depressed to set the brakes. To release the hydraulic lock, the operator depresses the accelerator pedal (which, when my invention is used, has a connection to a spring closed contact) to open switch MS and break the circuit. So long as the accelerator is in use, the brake locking mechanism remains inoperative.

To prevent vaporization of the mercury, due to arcing, a condenser C may be used, as indicated in Fig. 9.

When the embodiment of the circuit closer shown in Figs. 6–8 is employed, the operation is essentially the same as before. On the upgoing side the blades 32 sweep the mercury 28 into the pocket 29 on that side, where it is retained in major part; any portion of the mercury that gravitates down as the blade passes the pocket is caught by the next blade and raised again. The pockets 39 should be located below the horizontal a distance sufficient to enable the mercury to flow off the blades before the blades pass the upper ends of the pockets, at any speed for which the device is designed.

While I have referred to the use of copper for the metal of the strips 18 and 40, any other suitable metal may be used. However, the metal must be such as will be "wet" by the mercury, i. e., will retain a film of mercury on its surface.

From the foregoing it will be seen that a service application of the brakes may be made in the usual way and the brakes eased up in bringing the car to a gradual stop without the device locking the brakes, until a definite time interval has elapsed after the car has come to a dead stop.

What I claim is:

1. A vehicle brake system comprising means under control of the operator for effecting the application and the release of the brakes, means for holding the brakes applied, control means automatically operating at a predetermined time after the vehicle has been brought to rest for rendering the holding means effective, and means under control of the operator for disabling said holding means at will.

2. The combination with the brake system of a motor vehicle, which system includes a device under control of the operator for effecting application and release of the brakes, of holding means for the brakes, an automatic delayed-action means for rendering the holding means effective after the vehicle has come to rest, and another operator controlled means for disabling said holding means at will.

3. The combination with a motor vehicle having a propeller shaft, an accelerator pedal and a brake system, the latter including a manually operated device for effecting the application and release of the brakes, of holding means for the brakes, a delayed-action means rendered automatically effective by the cessation of the rotation of the propeller shaft for causing the holding means to be operative, and means operative upon actuation of the accelerator pedal for disabling said holding means.

4. A vehicle brake system comprising means under control of the operator for applying and releasing the brakes, an electrically energized brake holding device, a delayed-action rotary mercury switch driven from the propeller shaft of the vehicle and connected in the circuit of said brake holding device and constructed to close the circuit a predetermined time after the propeller shaft ceases to turn, and means under control of the operator for opening said circuit at will.

5. In a motor vehicle provided with brakes and means for applying the brakes, means for holding the brakes applied after they have been applied, means controlled by a rotatable member employed in driving the vehicle for causing said holding means to be operative only when a period of time has elapsed after said rotatable member has ceased to rotate.

6. In a motor vehicle provided with brakes and means for applying the brakes, means for holding the brakes applied after they have been applied, means controlled by a rotatable member employed in driving the vehicle for causing said holding means to be operative only when a period of time has elapsed after said rotatable member has ceased to rotate, and means for causing the holding means to be inoperative at will.

7. In a motor vehicle provided with brakes and means for applying the brakes, means for holding the brakes applied after they have been applied, and electrically-operated control means including a switch so governed by a rotatable member employed in driving the vehicle that said switch will not be closed until a period of time after said rotatable member has stopped rotating.

8. In a motor vehicle provided with brakes and means for applying the brakes, means for holding the brakes applied, and electrically-operated control means for causing said brake holding means to be operative and comprising a switch having a movable switch closing element which is permitted to assume switch closing position only when a period of time has elapsed after the vehicle wheels have stopped rotating.

9. In a motor vehicle provided with a fluid pressure braking system, valve means for holding the brakes in applied condition, a solenoid for governing the operativeness and inoperativeness of said valve means, and a circuit for said solenoid including a controlling switch for causing said solenoid to be so conditioned that the valve means will be inoperative to hold the brakes applied when the vehicle wheels are rotating and operative to hold the brakes applied only when a period of time has elapsed after the vehicle wheels have stopped rotating.

10. In a motor vehicle provided with brakes and means for applying the brakes, means for holding the brakes applied, electrically-operated control means for causing said brake holding means to be operative and comprising a switch having a body of mercury for electrically connecting two contacts, and means for maintaining said body of mercury in other than a connecting position as long as the wheels of the vehicle are rotating.

11. In a motor vehicle provided with brakes and means for applying the brakes, means for holding the brakes applied, electrically-operated control means for causing said brake holding means to be operative and comprising a switch having a body of mercury for electrically connecting two contacts, and means for maintaining said body of mercury in other than a connecting position until a period of time has elapsed after the wheels of the vehicle have ceased turning.

12. In a motor vehicle provided with wheels, with means for driving the wheels and with a fluid pressure braking system, valve means for holding the brakes in applied position, a solenoid for governing the operativeness and inoperativeness of the valve means, an electrical circuit for said solenoid including a switch having a body of mercury for electrically connecting two contacts, and means operable by the driving means for the wheels for maintaining said body of mercury in other than a connecting position as long as the wheels are turning and permitting said mercury to assume a connecting position only when a period of time has elapsed after the wheels have ceased turning.

13. In a motor vehicle provided with wheels, means for driving the wheels and with a fluid pressure braking system, valve means for holding the brakes applied in position, a solenoid for governing the operativeness and inoperativeness of the valve means, an electrical circuit for said solenoid including two switches, one of said switches having a body of mercury for electrically connecting two contacts, means operable by the driving means for the wheels for maintaining said body of mercury in other than a connecting position as long as the wheels are turning and permitting said mercury to assume a connecting position only when a period of time has elapsed after the wheels have ceased turning, and means for manually opening and closing the other switch.

14. In a motor vehicle having a member rotatable only when the vehicle is moving and also provided with operator-operated control means having inoperative and operative conditions and employable in controlling movement of said vehicle, means associated with the control means for modifying the operation thereof by the operator, and means for causing said modifying means to be operative only when said rotatable member ceases rotating and the vehicle is stopped, said last named means comprising an electrical circuit and a switch having a switch closing element so controllable by said member which is rotatable when the vehicle is moving that said element will assume switch-closed position only when a period of time has elapsed after said rotatable member has ceased rotating.

FRANK L. DARLING.